United States Patent
Miranda Cesar et al.

(10) Patent No.: US 11,436,747 B2
(45) Date of Patent: Sep. 6, 2022

(54) SYSTEM AND METHOD FOR SUPPORTING THE OPERATION OF SUBSEA INSTALLATIONS FOR 3D RECONSTRUCTION OF FLEXIBLE PIPES DURING A DIRECT VERTICAL CONNECTION OPERATION

(71) Applicant: PETROLEO BRASILEIRO S.A. - PETROBRAS, Rio de Janeiro (BR)

(72) Inventors: Vinicius Miranda Cesar, Recife (BR); Saulo Andrade Pessoa, Recife (BR); Judith Kelner, Recife (BR); Ismael Humberto Ferreira Dos Santos, Rio de Janeiro (BR); Eduardo Vardaro, Rio de Janeiro (BR); Bernardo Fonseca Reis De Souza, Recife (BR); Arthur Curty Saad, Rio de Janeiro (BR); Alyson Gomes Vaillant, Rio de Janeiro (BR); Allan Carre De Oliveira, Rio de Janeiro (BR)

(73) Assignee: PETROLEO BRASILEIRO S.A.—PETROBRAS

( * ) Notice: Subject to any disclaimer, the term of this patent is extended or adjusted under 35 U.S.C. 154(b) by 29 days.

(21) Appl. No.: 17/258,518

(22) PCT Filed: Jul. 10, 2019

(86) PCT No.: PCT/BR2019/050265
§ 371 (c)(1),
(2) Date: Jan. 7, 2021

(87) PCT Pub. No.: WO2020/010425
PCT Pub. Date: Jan. 16, 2020

(65) Prior Publication Data
US 2021/0248771 A1    Aug. 12, 2021

(30) Foreign Application Priority Data

Jul. 13, 2018  (BR) .................. 102018014298-4

(51) Int. Cl.
*G06T 7/60* (2017.01)
*G06T 7/80* (2017.01)
(Continued)

(52) U.S. Cl.
CPC .............. *G06T 7/60* (2013.01); *E21B 17/012* (2013.01); *E21B 17/017* (2013.01); *G06F 30/18* (2020.01);
(Continued)

(58) Field of Classification Search
CPC ... G06T 7/60; G06T 7/85; G06T 2207/10016; G06T 7/64; G06T 15/10; G06T 17/10;
(Continued)

(56) References Cited

U.S. PATENT DOCUMENTS 6,461,083 B1 * 10/2002 Pionetti ................. E21B 17/015
405/224.2
7,080,689 B2    7/2006 Guesnon
(Continued)

FOREIGN PATENT DOCUMENTS

WO    2016130155 A1    8/2016

OTHER PUBLICATIONS

Santos, et al., "Real Time Radius of Curvature During DVC Operations Based on Flexible Pipe 3D Reconstruction";. Offshore Technology Conference, Rio de Janeiro, Brazil; 2015.
(Continued)

*Primary Examiner* — Susan E. Hodges
(74) *Attorney, Agent, or Firm* — J.A. Lindeman & Co., PLLC (57) ABSTRACT

This invention provides a system and a method for supporting the operation of subsea installations for 3D reconstruc-
(Continued)

tion of flexible pipes (1) during a direct vertical connection operation, comprising the steps of painting the flexible pipe (1) with a specific regular pattern, and performing a 3D reconstruction of the points sampled on the flexible pipe (1) to obtain the radius of curvature of the flexible pipe (1), in which the 3D reconstruction comprises the steps of: capturing images of the flexible pipe (1) during the direct vertical connection operation; sending the captured images to a dedicated computer (4); and processing the captured images, generating information on the radius of curvature, wherein the method initially comprises at least one of the following steps: painting the bend restrictor (6) with a specific regular pattern; painting straps (71) for buoys (7) with a specific regular pattern; and painting straps (71) for the arch bend, in the event of second-end direct vertical connection.

16 Claims, 9 Drawing Sheets

(51) Int. Cl.
*H04N 13/239* (2018.01)
*G06F 30/18* (2020.01)
*E21B 17/01* (2006.01)
*G06F 113/14* (2020.01)

(52) U.S. Cl.
CPC .............. *G06T 7/85* (2017.01); *H04N 13/239* (2018.05); *G06F 2113/14* (2020.01); *G06T 2207/10016* (2013.01)

(58) Field of Classification Search
CPC ...... E21B 17/012; E21B 17/017; E21B 17/01; E21B 17/02; E21B 17/20; G06F 30/18; G06F 2113/14; H04N 13/239; H04N 13/246; G01B 11/255
USPC .......................................................... 348/81
See application file for complete search history.

(56) References Cited

U.S. PATENT DOCUMENTS

| 7,630,866 | B2 | 12/2009 | Guesnon | |
|---|---|---|---|---|
| 7,789,588 | B2 | 9/2010 | De Aquino | |
| 2008/0317555 | A1* | 12/2008 | De Aquino | F16L 57/02 405/195.1 |
| 2013/0319061 | A1* | 12/2013 | Tofini | B21D 7/14 72/11.1 |
| 2016/0102975 | A1* | 4/2016 | McCloskey | G01B 21/045 702/97 |

OTHER PUBLICATIONS

International Search Report of PCT International Application No. PCT/US2019/050265 dated Oct. 7, 2019.

* cited by examiner

FIG. 1

Average percentage error of the RC (%)

| Noise (m) | 3 points | 5 points | 7 points | 9 points |
|---|---|---|---|---|
| 0.1 | 90.202 | 91.841 | 91.700 | 90.850 |
| 0.01 | 48.320 | 52.142 | 53.408 | 52.308 |
| 0.001 | 5.753 | 7.304 | 7.563 | 7.745 |
| 0.0001 | 0.576 | 0.706 | 0.792 | 0.780 |
| 0.00001 | 0.060 | 0.073 | 0.077 | 0.079 |

SYSTEM AND METHOD FOR SUPPORTING THE OPERATION OF SUBSEA INSTALLATIONS FOR 3D RECONSTRUCTION OF FLEXIBLE PIPES DURING A DIRECT VERTICAL CONNECTION OPERATION

FIELD OF THE INVENTION

This invention is related to the area of Subsea Engineering designs to support the interconnection of flexible oil and gas pipes between wells and platforms in deep water. More specifically, the invention is related to Direct Vertical Connection (DVC) operations developed by the applicant. The invention is therefore in regard to a methodology and a tool for real-time monitoring of the radius of curvature of the flexible pipe during DVC operations in order to increase the safety and operating efficiency of these operations.

BACKGROUND OF THE INVENTION

During a Direct Vertical Connection operation (hereinafter DVC), installation of the Vertical Connection Module (hereinafter VCM) is a complex step that may take days to be concluded. Additionally, factors such as environmental conditions, visibility and potential risks to the flexible pipe and to the subsea equipment may create even longer delays in the process.

As is widely known, during a DVC operations, forces are exerted against the VCM by the flexible pipe. Therefore, in order for this operation to be performed safely, both for the equipment as well as for the flexible pipe, it is necessary for the forces on the VCM and the radius of curvature of the pipe to be within the limits established by the manufacturers during all steps of the operation.

However, determining the forces on the VCM and the configuration of the pipe during installation is complex, because it depends on the characteristics of the pipe, the VCM, environmental conditions, and the characteristics of the PLSV vessel (Pipe Laying Support Vessel) that installs the flexible pipe.

The configuration of the flexible pipe in a DVC operation depends on the flexural rigidity (EI) of the pipe, which in turn is a function of the pressure, temperature, and forces at the time of operation. Therefore, the real value of the flexural rigidity is a parameter that has to be estimated during the operation in order to obtain precise configuration and dynamic behavior of the flexible pipe during the DVC.

The radius of curvature of the flexible pipe may be determined by the flexural rigidity (EI), and it must be monitored to prevent its minimum value from being violated, which may lead to damages to the flexible pipe.

In order to mitigate possible damage to the flexible pipe, a device called a bend restrictor is used, which locks at the minimum radius of curvature allowed for the line, preventing it from bending in a radius that is lower than permitted.

However, locking the bend restrictor can cause damage to the VCM structure, such as breaking the gooseneck and/or the subsea equipment to which the VCM is connected, such as the Hub of the Production Adaptor Base (PAB), or the Hub of the subsea Pipeline End Manifold (PLEM), among other equipment.

Thus the main objective of this invention is to obtain an estimate of the curvature of the pipe using 3D reconstruction of the geometry of the pipe, and real-time physical simulation of the static equilibrium during the DVC operation.

Real-time knowledge of the radius of curvature along the flexible pipe, and of the forces involved during installation obtained by the system presented herein, prevents the launch engineer from making risky movements that might damage the pipe or the VCM, preventing coupling of the VCM to the subsea equipment in risky situations.

Another possible application for this invention concerns its use in qualification tests on flexible pipes, such as the DIP test (Deep Immersion Performance test), which will allow improved evaluation of the behavior of the flexible pipe during the test, since through monitoring it becomes possible to obtain the radius of curvature with greater precision during the test.

In order to partially resolve the problems listed, the document "*Real Time Radius of Curvature Measurement During DVC Operations Based on Flexible Pipe 3D Reconstruction*" (SANTOS, I. H. F.; VARDARO, E.; GOES, E.; LOPES, V. S.; VAILLANT, A.; PALMEIRO, A.; KELNER J.; CESAR, V. M.; PESSOA, S.; REIS, B. OTC 2015—Offshore Technology Conference. Rio de Janeiro, 2015) is already known.

That document explains a methodology for helping a pipe installation engineer perform DVC operations safely. It is based on a computational view system used to estimate the curvature of flexible pipes during DVC operations, in order to increase operating efficiency through the use of stereo cameras and some markings along the pipe.

The described system has a stereo set of lowlight cameras and a staggered pattern of black and white markings painted on the pipe. The system performs its task through a sequence of three different phases: calibration, detection and estimation of the radius of curvature.

In order to detect and reconstruct the 3D geometry of flexible pipes, the methodology is based on a staggered pattern of black and white marks, which should cover the entire surface of the pipe segment that is being analyzed. That pattern allows the system to distinguish between pipe segments over time.

Once calibrated, the system continuously tries to identify the staggered pattern in the images. The detection algorithm uses topological restrictions to segment the image of the best possible candidates for the white marks, and then it applies the technical backtracking algorithm to choose which of those candidates really pertain to the flexible pipe.

As described in this document, since the detection process takes a long time to be processed due to the need to research every image, a different approach is used to follow the pipe over time. The tracking procedure is a two-step energy maximization technique based on the fact that the pipe is moved slightly from frame to frame, thus decreasing the search space for investigating the maximums in the next frame of the image.

Finally, when the white markings representing the sections of the pipe being reconstructed in each image from the pair of cameras are found, the 3D geometry of the middle axis of the pipe may be reconstructed as an analytical curve. That process is done by simultaneously adjusting a curve to the set of points in each image. Finally, an overhead line is adjusted to the projection of the 3D point in the dominant plane sampled from the curve, in order to evaluate the curvature of the pipe.

However, the system revealed by the document in question does not reference the marking of the bend restrictor, of the buoy straps used in first- and second-end DVC operations, and particularly the straps for the arch bend of the second-end DVC.

Without the mentioned marking a (bend restrictor), the detection algorithm that was initially described simply does not function, as was verified during the field tests subsequently performed after publication of the article.

It was also verified in field tests that obtaining the curvature K from the overhead curve adjusted to the projection of the 3D points on the plane that is perpendicular to the cameras, does not function correctly. This is because the uncertainty in the position of the points is high, since acquisition resolution is very low. Each reconstructed point is sampled as the centroid of the marking on the pipe that is proportional to its diameter. Therefore the uncertainty regarding the real position of the medial axis of the pipe defined by each centroid of the white regions from the image is on the order of half of the diameter of the pipe, which generally varies from 6 to 8 inches, that is, around 10 cm.

Furthermore, calculation of the first and second derivatives (according to the curvature equation κ of the line defined below), excessively amplifies the uncertainty regarding the final value of the curvature obtained using this method.

$$\kappa = \frac{x'y'' - x''y'}{(x'^2 + y'^2)^{\frac{3}{2}}}$$

Figure 1:
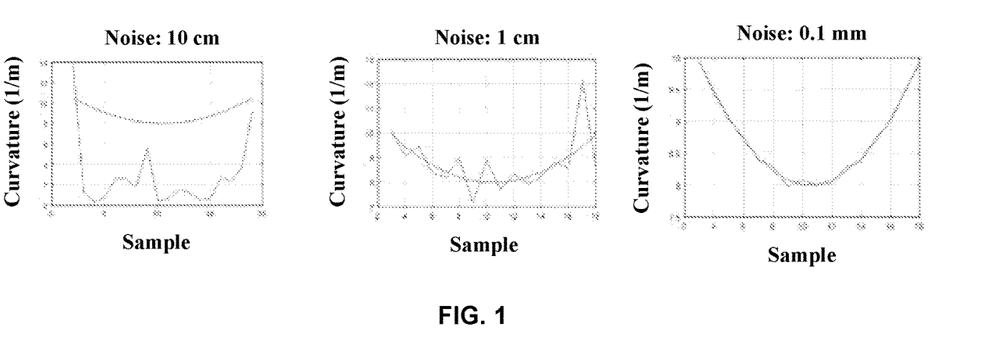
FIG. 1 shows the behavior of the RC error in accordance with the noise from the data, in conformance with the method of Support for Subsea Installations Operation described by the state of the art.
Figure 1A:
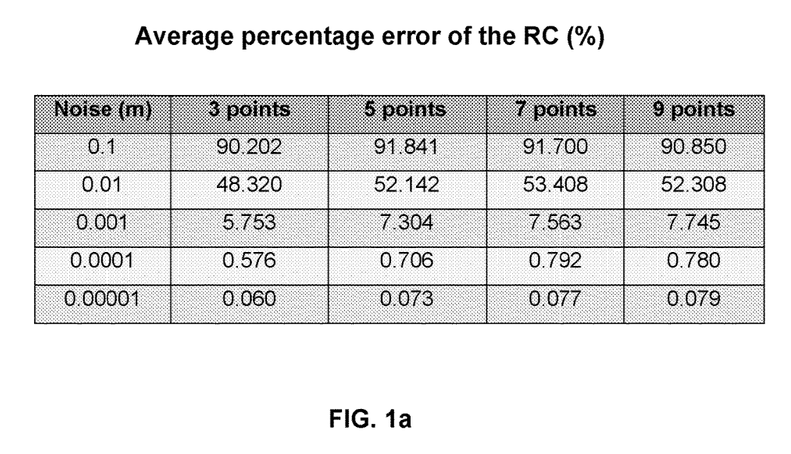
FIG. 1a shows the behavior of the mean percentage error of the RC in relation to the real value, in accordance with the number of 3D points reconstructed, in conformance with the method of Support for Subsea Installations Operation described by the state of the art.

FIG. 1 shows the behavior of the error of the radius of curvature (RC=1/κ) according to the noise of the data, in conformance with the method described by the document from the state of the art in question. FIG. 1a shows the behavior of the error of the RC according to the number of 3D points reconstructed.

For this reason, the method described in the state of the art is shown to be lacking for a new solution based on the physical simulation of the static equilibrium of the forces acting on the system.

As will be further detailed below, this invention seeks to find a practical and efficient solution to the problems in the state of the art described above.

SUMMARY OF THE INVENTION

The objective of this invention is to provide a Support Tool for Operation of Subsea Installations that enables precise estimation of the forces on a VCM and the radius of curvature of the pipe during all steps of a DVC operation.

In order to attain the objectives described above, this invention provides a method for supporting the operation of subsea installations to obtain the radius of curvature (RC) using 3D reconstruction of flexible pipes during a direct vertical connection operation. The method is comprised of the steps of painting the flexible pipe with a specific regular patterns, performing a 3D reconstruction of the points sampled on the flexible pipe, and finally obtaining the radius of curvature of the flexible pipe. The 3D reconstruction comprises the steps of: capturing images of the flexible pipe during the DVC operation; sending the captured images to a dedicated computer; processing the images by generating information on the radius of curvature (RC). During the painting process, furthermore, the bend restrictor should also be painted, using a regular pattern that is coherent with the pattern used for the pipe; painting the straps for the buoys with a specific regular pattern; and painting the straps for the arch bend, in the event of a second-end DVC operation. This invention further comprises a support system for operation of subsea installations, called an SOIS, to obtain the RC from the 3D reconstruction of flexible pipes during direct vertical connection operations. In addition, this invention performs a physical online simulation of the static equilibrium of the pipe in order to obtain the radius of curvature (RC) of the flexible pipe. The physical simulation comprises evaluation of the static equilibrium of the system containing: VCM (with or without adaptor), flexible pipe and accessories (connector and bend restrictor), straps for the buoys, and straps for the arch bend. The static equilibrium of the system is realized by discretely performing numeric modeling of all the parts listed above, considering the points obtained from the 3D reconstruction and all of the forces involved in real time. The positions of the points obtained from the 3D reconstruction are used as restrictions used in the optimization process executed by the physical simulation, executed optimally in GPU.

BRIEF DESCRIPTION OF THE FIGURES

The detailed description presented below references the attached figures and their respective reference numbers.

DETAILED DESCRIPTION OF THE INVENTION

First, note that the following description will begin with a preferred realization of the invention. As will be obvious to any technician in the matter, however, the invention is not limited to this particular realization.

This invention seeks to support the process of installing a Vertical Connection Module (VCM) during a Direct Vertical Connection (DVC) procedure. To do so, the invention provides a methodology for allowing the Support for Operation of Subsea Facilities (SOIS) that will be described in detail in the following paragraphs.

Solely for informational purposes, note that the term "Support for Operation of Subsea Facilities" will be replaced in this report by the acronym SOIS. This choice is made in order to simplify the description, and in no way will it impact the understanding of the invention.

In addition, some terms used repeatedly in this report will be presented below to ensure that they will not cause confusion in the following description. These terms are the following:

Flexible pipe (or pipe)—Flexible pipe (such as a flowline or riser) that will be installed in the DVC operation;
Bend restrictor—Mechanical device that acts as a mechanical stopper, limiting the radius of curvature of flexible pipes to a minimum value. This equipment, in turn, is comprised of the following components:
  Adaptation piece—Bipartite piece that connects the start of the bend restrictor to the VCM connector;
  Internal rings—Bipartite pieces that are connected to two external rings; and
  External rings—Bipartite pieces that are connected to two internal rings;
Buoy straps—Arrangement of lines that tie buoys to the flexible pipe;
Hoisting strap/sling—Arrangement of lines that are attached to the flexible pipe to help form the arch bend for second-end DVC operations;
ROV—Remotely Operated Vehicle, which is an undersea vehicle that is operated remotely.
DVC—Direct Vertical Connection, which is an operation that must be monitored by the SOIS; and
Installer—Technical team responsible for carrying out the operation.

As already mentioned, the invention may be used in all operations interconnecting pipes between wells, manifolds, and Floating Production Storage and Offloading (FPSOs) vessels with first- and second-end DVC procedures. In addition, DIP Test operations may also be monitored using SOIS methodology.

Figure 2:
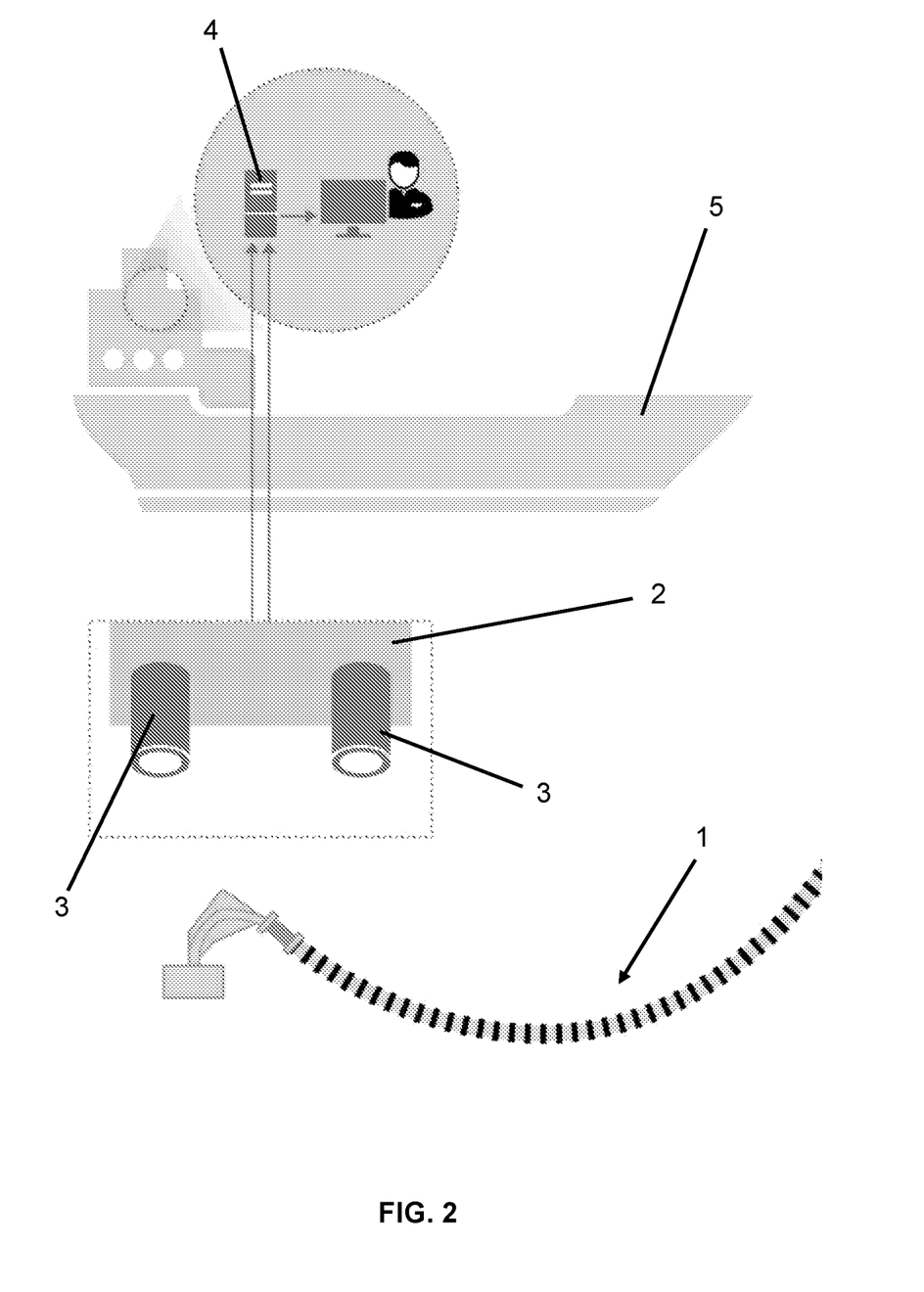
FIG. 2 shows an overview of the SOIS system, in accordance with a preferred configuration of the present invention.

FIG. 2 shows an overview of the SOIS system, in accordance with a preferred configuration of this invention, however, the invention is not limited to this particular realization. Note that the SOIS system is basically comprised of: hardware (cameras (3), a dedicated computer (4), and cables to receive video signals from the ROV), and accessories (calibration pattern).

Figure 3A:
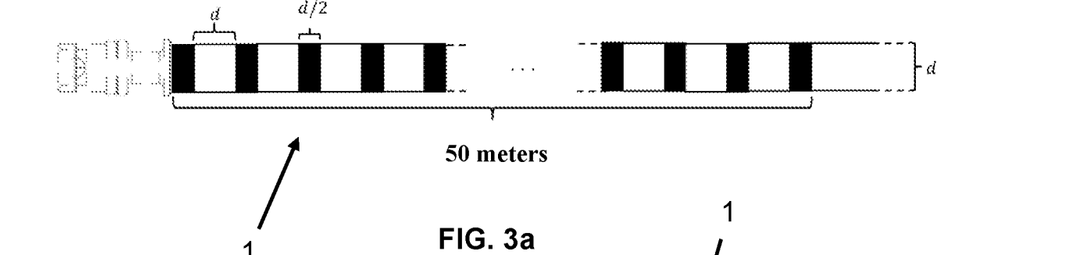
FIG. 3a shows an optional configuration of the specific regular pattern used to mark the flexible pipe.
Figure 3B:
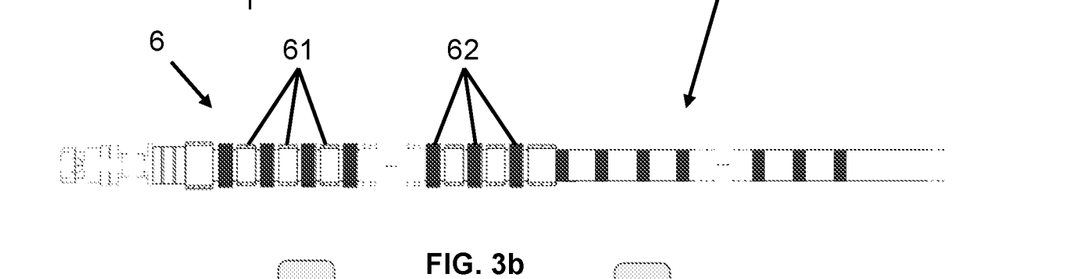
FIG. 3b shows an optional configuration of the specific regular pattern used to mark the bend restrictor in a way that is compatible with the marking on the flexible pipe.

The methodology also describes the operating procedures to be followed before and during installation of the VCM. The pipe (1) and the bend restrictor (6) (see FIG. 3) should be painted following a specific regular pattern to allow it to be detected under illumination conditions present at the bottom of the ocean in ultra-deep waters.

Thus, the SOIS methodology initially comprises the steps of: marking (see FIG. 3) the flexible pipe (1) with a specific regular pattern; and marking the bend restrictor (6) in a manner that is compatible with the regular pattern used on the pipe (1). Preferably these steps will be carried out on a support base on land, to diminish the impact on board; however, the marking is not restricted to the mentioned support base located on land, and may be done or reinforced on board the vessel (5).

When active, the SOIS monitors the operation to provide support to the installation in the following manner. Two video cameras (3) installed on the ROV (2) capture images of the flexible pipe (1) during the DVC. These images are then sent to the dedicated computer (4) and processed by the SOIS. Finally, the value of the radius of curvature is presented to the launch engineer in real time. See FIG. 2.

In the preferred configuration of the invention, the specific regular pattern used comprises alternating black and white bands. FIG. 3a shows an optional configuration of the specific regular pattern used to mark the flexible pipe (1). FIG. 3b shows an optional configuration of the specific regular pattern used to mark the bend restrictor (6) in a manner that is coherent with the marking of the pipe (1).

The marking to be used on the flexible pipe (1) is a staggered and regular sequence of black and white areas, as shown in FIG. 3a, in which a series of requirements may be used.

The marking should be done using matte paint (no shine) in black and white, wherein the length of a white area must be equal to the outside diameter (d) of the pipe (1), and the length of a black area must be equal to half of the outside diameter (d/2) of the pipe (1). The marking is not restricted to using the colors black and white, or to the lengths described above. Another combination of colors and painted lengths may be used that allow data capture and reconstruction of the structure without harm.

Optionally, marking should be done on the first 50 meters of the pipe (1). If the pipe (1) has to be painted or touched up on board, the section under the bend restrictor (6), in the compressed position, does not need to be painted our touched up.

In an ideal configuration of this invention, the marking of the flexible pipe (1) is the responsibility of the installer, with supervision by an inspector on board the installation ship (5). Ideally the flexible pipe (1) should be marked prior to being loaded, with the installer being responsible for the final marking on the pipe (1) following the recommendations presented.

In relation to marking the bend restrictors (6), it is preferable to have a staggered pattern of black and white areas that is similar to that marked on the pipe (1), as shown in FIG. 3b.

Also for the bend restrictor (6), the marking should be done using matte paint (no shine) in the colors black and white, and also using black-colored matte tape. Marking is not restricted to the use of black and white described above. Another combination of colors may be used that allows data capture and reconstruction of the structure without damage.

Additionally, the internal rings (61) are painted white, the external rings (62) are painted black, and the adaptation piece is painted white. After installation of the external rings (62), they should be wrapped in black tape in order to hide the anodes. The color of the tape is not restricted to black, but it should follow the coloring of the external rings (62).

Preferably the marking of the bend restrictor (6) is also the responsibility of the installer, with supervision of an inspector on board the installation ship (5).

Ideally, the bend restrictor (6) should be painted prior to being loaded. It is the responsibility of the installer to perform the final marking of the bend restrictor (6), following the recommendations presented.

Figure 4A:
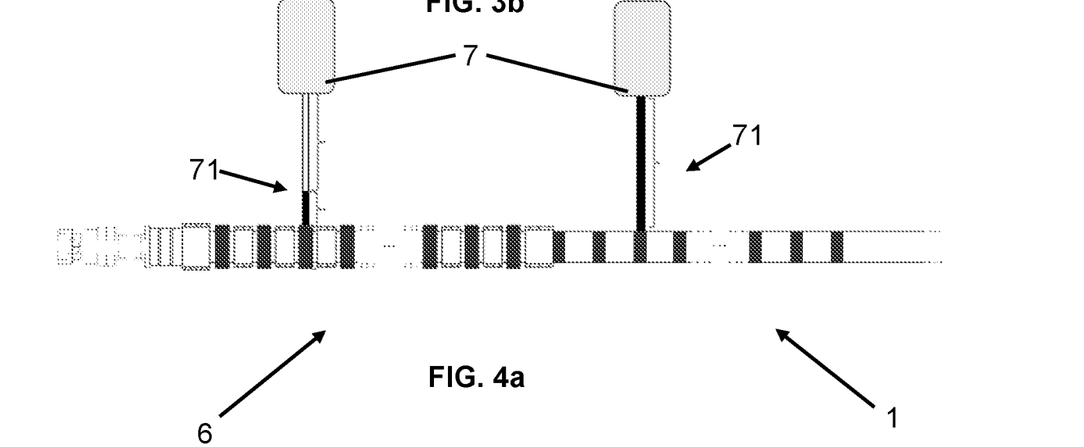
FIGS. 4a and 4b show two optional configurations for marking the straps for the buoys in accordance with one configuration of this invention. Note that the objective is to allow the first buoy to be marked precisely, while the remaining buoys should not be confused with the regular white markings on the flexible pipe.
Figure 4B:
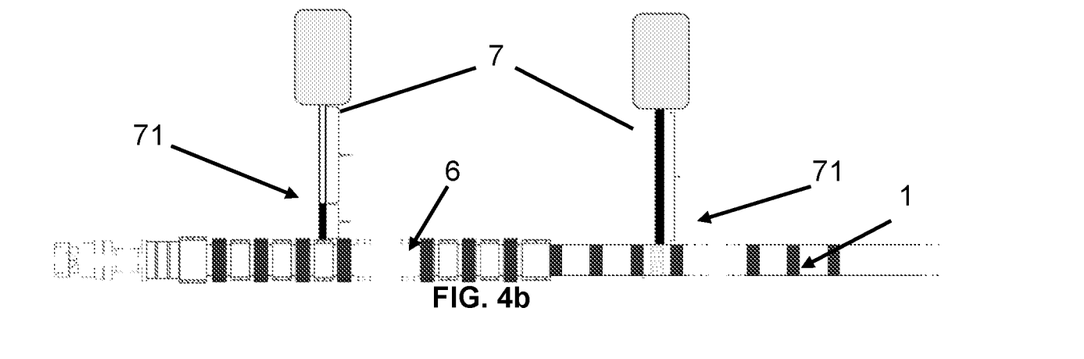

To estimate the curvature and to provide a more precise estimate, the SOIS methodology of the invention also optionally proposes identification of the points for attaching the buoys (7) to the flexible pipe (1). To do this, the straps (71) for the buoys (7) must be marked.

FIGS. 4a and 4b thus show two optional configurations for marking the straps (71) of the buoy in accordance with this invention.

In accordance with this invention, the straps (71) for the buoys (7) must be marked with matte tape (no shine) in black and white, wherein the marking of the strap (71) of the first buoy (positioned closest to the VCM) is different from the marking of the straps (71) of the other buoys (7). Just as with the marking of the flexible pipe (1) and of the bend fastener (6), the marking is not restricted to use of the colors black and white described above, and another combination of colors may be used that allows data capture and reconstruction of the structure without damage.

Therefore, on the strap (71) of the first buoy, a section of the strap (71) closest to the pipe (1) is marked with black tape and the rest is marked with white tape.

Preferably, the first 25 centimeters of the strap (71) (starting from the pipe (1) to the buoy) should be marked with black tape. After the initial 25 centimeters, the strap (71) should be marked using white tape every 1.5 meters, or until the buoy is reached.

On the other buoys (7), the straps (71) should be marked with black tape within the 2 meters closest to the pipe (1), or along the entire length of the strap (71).

In marking all of the straps (71), the part that remains rolled up in a given area of the pipe (1) or of the bend restrictor (6) should be marked in such a way that it does not impede recognition of the areas of the pipe (1). In other words, if the strap (71) is rolled up in a black area, the rolled-up part of the strap (71) should be covered with black tape. And if the strap (71) is rolled up in a white area, the rolled-up part should also be covered with white tape, as shown in FIG. 4b.

Marking of the straps (71) for the buoys (7) should also be the responsibility of the installer, with supervision by an inspector on board the installation ship (5).

Figure 6:
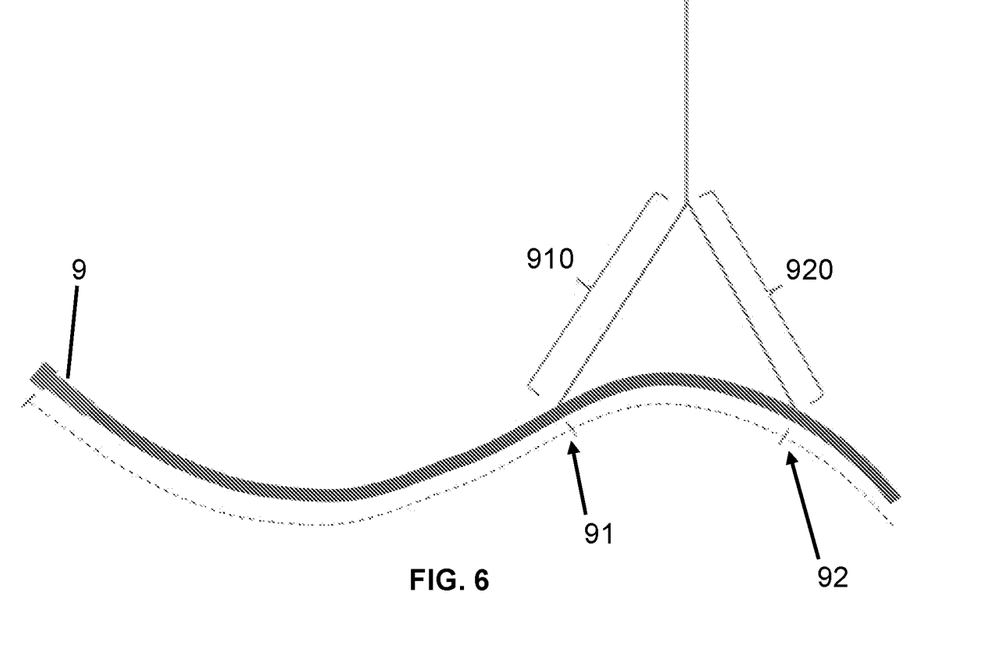
FIG. 6 schematically shows the elements of the second-end DVC arch bend.

In the case of second-end DVC operations, the hoisting straps (91) and (92) for formation of the arch bend should be marked with black tape within the 2 meters closest to the pipe (1), or along the entire length of the hoisting straps (91) and (92).

In marking the hoisting straps (91) and (92), the part of the strap that remains rolled up in a given area of the pipe (1) or of the bend restrictor (6) should be marked in such a way that it does not impede recognition of the areas of the line, in a manner that is similar to how the buoy straps are marked, that is, using the same color used in that area. In other words, if the hoisting straps (91) and (92) are rolled up in a black area, the rolled-up part of the hoisting straps (91) and (92) should be covered with black tape. Otherwise, if the hoisting straps (91) and (92) are rolled up in a white area, the rolled-up part should be covered with white tape.

Marking of the hoisting straps (91) and (92) for the pipe (1) should also be the installer's responsibility, with supervision by an inspector on board the installation ship (5).

For execution, the SOIS requires that some information on DVC operation be provided, such as physical characteristics of equipment, such as the flexible pipe (1), the buoys (7), the bend restrictor (6) and the VCM. This information, which will be presented in detail below, may be provided at different times during execution by the SOIS, as will be obvious with the following description.

Furthermore, the majority of the information may be provided by the ground team that performs the study on the DVC configuration prior to operation. This information may be provided through a form delivered to the launch engineer, to be inserted directly into a user interface provided by the SOIS to monitor the DVC operation.

Other information may only be obtained by the launch engineer moments before or during the DVC operation. Provision of the DVC information is the responsibility of the installer, with supervision by an inspector on board the installation ship (5).

Figure 5:
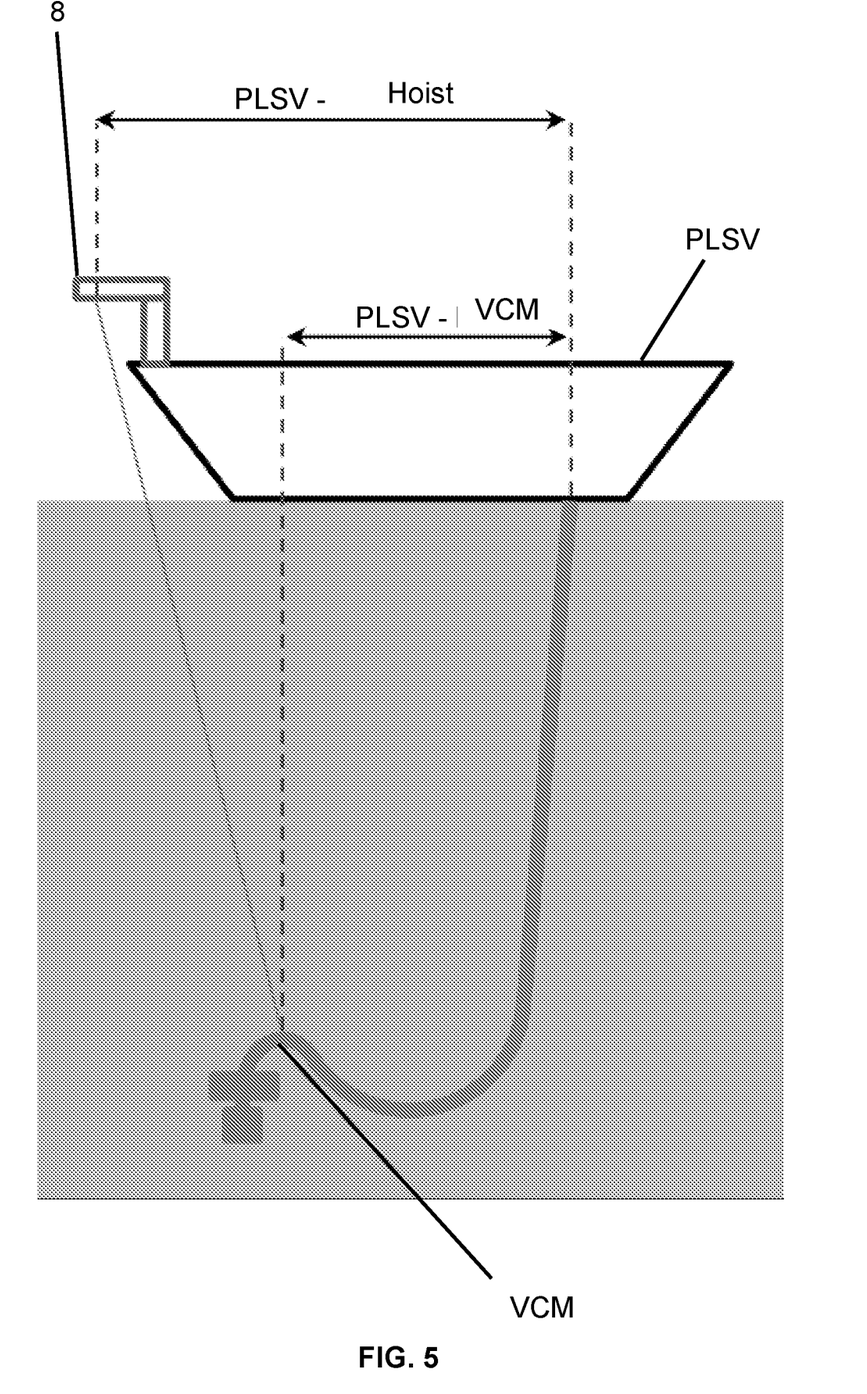
FIG. 5 schematically shows the PLSV-Hoist distance and the PLSV-VCM distance.
Figure 7:
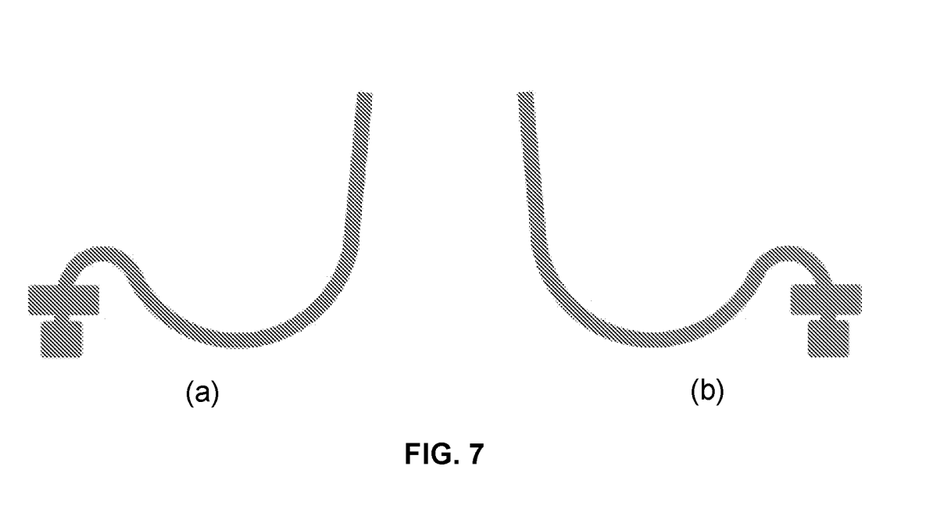
FIG. 7 shows two options for coupling the VCM, as projected by the method of this invention.

The parameters to be provided are shown schematically in FIGS. 5, 6 and 7, in which FIG. 5 schematically shows the PLSV-Hoist distance and the PLSV-VCM distance. FIG. 6 schematically shows the elements of the DVC arch bend. FIG. 7 shows two options for coupling the VCM, as projected by the method of this invention, shown with the VCM to the left or to the right, FIGS. 7a and 7b.

Therefore, in general the SOIS requires information from the following general parameters:

Type of DVC, that is, if the type of DVC is first or second end;

Value of the water line, that is, the distance between the sea floor and the surface (provide only if it is a first-end DVC);

PLSV-VCM distance, that is, the horizontal distance between the end of the pipe (1) on the PLSV (5) and the eyebolt of the VCM, as shown in FIG. 5. That data point is obtained by taking a still shot of the VCM with the ROV (2) (provide only if it is a first-end DVC);

PLSV-Hoist distance, that is, the horizontal distance between the end of the pipe (1) on the PLSV (5) and the hoist (8), as shown in FIG. 5. That data point should be calculated based on the position of the hoist (8) in relation to the PLSV (5) (provide only if it is a first-end DVC);

Length of the first hoisting strap (910) of the arch bend (provide only if it is a second-end DVC);

Length of the second hoisting strap (920) of the arch bend (provide only if it is a second-end DVC);

Position along the pipe of the first hoisting strap (91), that is, the length between the flange (9) of the VCM to the first hoisting strap (91) of the arch bend (provide only if it is a second-end DVC);

Position along the pipe of the second hoisting strap (92), that is, the length between the flange (9) of the VCM to the second hoisting strap (92) of the arch bend (provide only if it is a second-end DVC); and Side of the coupling in the image, that is, state "Left" if the VCM appears to the left of the other end of the pipe (1) in the image from the cameras (3) (FIG. 7a), otherwise state "Right" (FIG. 7b).

The SOIS also requires information from the following parameters from the pipe (1):

The value of the minimum radius of curvature (MBR) that the pipe (1) may attain during operation;

The value of flexural rigidity (EI=$RC_{locking} \times M_{locking}$), in which the radius of curvature of locking of the bend restrictor (6) $RC_{locking}$ (or the minimum radius of the pipe (1), in the event a bend restrictor (6) is not used) is equal to the inverse of the locking curvature, i.e. $1/k_{locking}$, and the factor $M_{locking}$ is the moment corresponding to the radius of the locking curvature, which is obtained from the hysteresis curve provided by the equipment manufacturer;

The axial rigidity of the pipe (1) (EA); and

The linear net weight of the pipe (1) when submerged in seawater (i.e., it must be considered whether the pipe (1) is full of seawater or empty).

The following bend restrictor (6) parameters must also be provided to the SOIS:

If the pipe (1) is installed with a bend restrictor (6) or not, wherein, if the pipe (1) is not installed with a bend restrictor (6), the other fields related to the bend restrictor (6) should not be filled in;

Value of the locking radius of the bend restrictor (6) (MBR);

Maximum length of the bend restrictor (6) installed on the pipe (1); and

The net weight of the bend restrictor (6) when submerged in seawater.

The SOIS also needs the following parameters from the adaptor:

If an adaptor is used to connect the pipe (1) to the VCM or not, wherein, if the adaptor is not used, the other fields related to the adaptor should not be filled in;

Length of the adaptor;

Net weight of the adaptor when submersed in seawater (i.e., it must be considered if the adaptor is full of seawater or empty).

The following parameters from the connector must also be provided to the SOIS:

Length of the connector; and

Net weight of the connector when submerged in seawater (i.e., it must be considered whether the connector is full of seawater or empty).

The following parameters from the VCM (when necessary):

The smallest angle that the gooseneck forms with the vertical axis of the VCM;

Vertical distance from the flange (9) of the VCM to the sea floor;

Vertical distance from the eyebolt to the flange (9);

Horizontal distance from the eyebolt to the flange (9);

Vertical distance from the flange (9) to the center of gravity;

Horizontal distance from the flange (9) to the center of gravity;

Vertical distance from the flange (9) to the base of the VCM;

Horizontal distance from the flange (9) to the center of the hub on the VCM; and VCM weight when submerged.

Finally, the following parameters of the buoys (7) must be provided for the SOIS method:

Distance between the flange (9) of the VCM and the point at which the buoy (7) is attached; and The net thrust of the buoy (7).

The SOIS system also foresees use of two video cameras (3) to capture images from the pipe (1), wherein those cameras (3) must be high resolution, especially in low-light environments, in addition to being able to withstand the undersea environment.

Preferably, the cameras (3) should have the minimum following specification: light sensitivity of at least $1.3 \times 10^{-3}$ Lux; and field of view in the water of a minimum of 80°.

Figure 8:
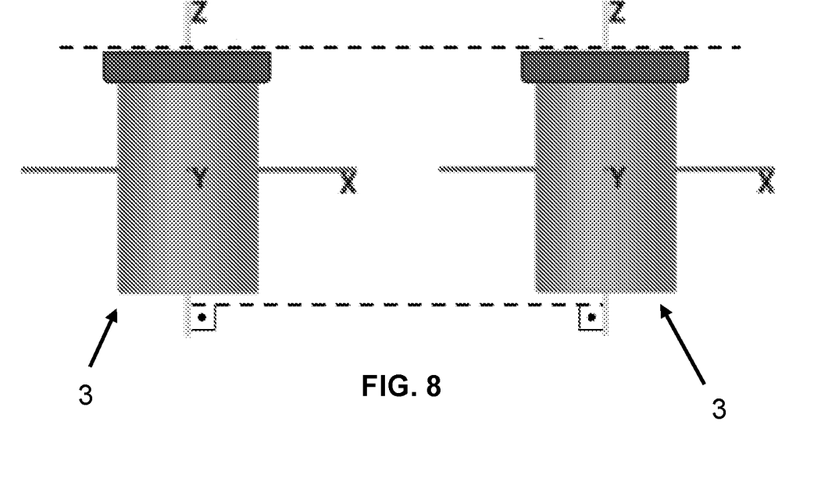
FIG. 8 shows a schematic view of the position of the cameras in the SOIS system of this invention.

FIG. 8 shows a schematic view from the top of the position of the cameras (3) of the SOIS system of this invention.

The cameras (3) must be attached to an ROV (2) so that their positioning (3) cannot be changed throughout the entire operation. Thus it is recommended that they be attached to a location where they will be protected from mechanical shocks.

The distance between the cameras (3) (DBC) should preferably be a minimum of 1 meter and a maximum of 1.5 meters. The cameras (3) should be positioned next to each other, and at the same height in relation to the base of the ROV (2), and the lenses (front part) of the cameras (3) must be aligned. The distance described above is not restrictive, therefore another distance may be used as long as it is capable of allowing data capture and reconstruction of the structure without damage.

Additionally, the symmetry axes of the cameras (3) (Z axes) must be parallel, and the cameras (3) should be positioned on the ROV (2) such that the calibration patterns can be seen correctly during the calibration procedure.

The cameras (3) are preferably positioned on the upper part of the ROV (2), wherein the position should ensure that other pieces of equipment (such as the arm of the ROV (2)) do not appear in the field of view of the cameras (3).

To transmit the video signal from the ROV (2) to the dedicated computer (4), a direct connection is projected that transmits the video signal from the cameras (3) on the ROV (2) to the dedicated computer (4) of the SOIS on the ship. The equipment used (connectors and cables) and the means of signal transport (electrical or optical) will be the installer's responsibility.

Optionally, the cables that transport the video signals from the cameras (3) should have BNC-type connectors so that they can be connected to the capture device that is installed in the dedicated computer (4).

The SOIS described herein also projects a camera calibration step so that the SOIS can estimate the radius of curvature of the area marked on a flexible pipe (1). The calibration procedure consists of capturing images from a calibration pattern using the SOIS software, wherein a series of recommendations must be followed.

It is important that the procedure be done with the cameras (3) attached to the ROV (2).

The calibration procedure should always be done when any one of the following events occurs:

When one or more video cameras (3) are installed or reinstalled on the ROV (2) support;

When it is found that one or more video cameras (3) had their attachments altered for any reason;

And/or when it is found that one or more video cameras (3) underwent shocks.

It is also recommended that calibration be performed right before the ROV (2) is submerged to perform the DVC operation.

Figure 9:
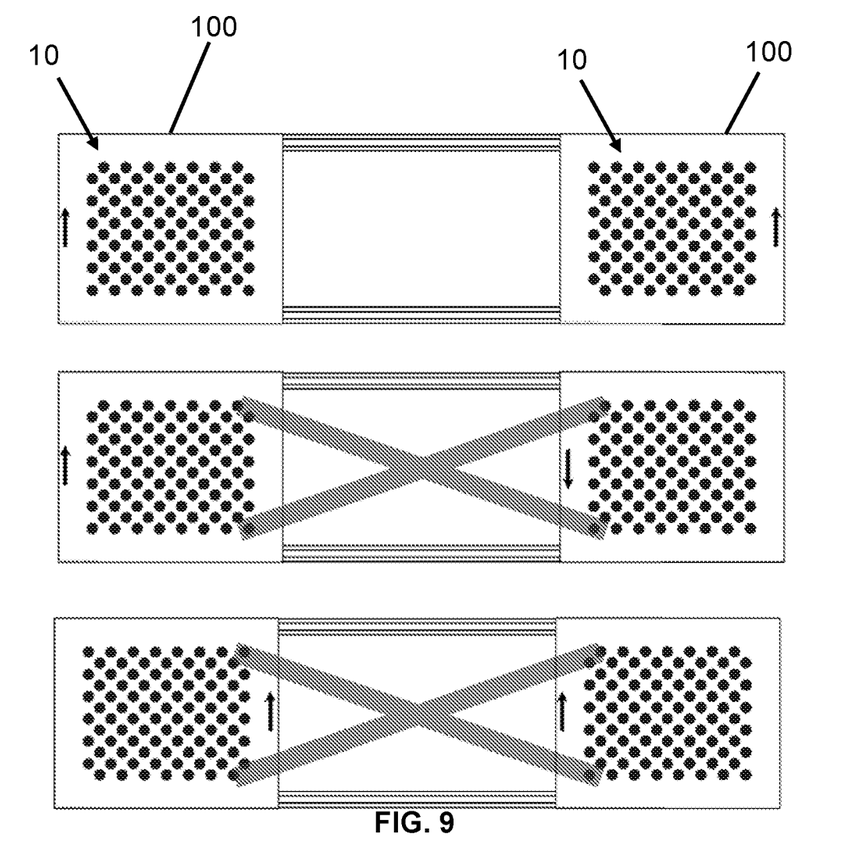
FIG. 9 shows a view of the calibration pattern as projected by this invention.

For calibration, it is necessary to construct a calibration pattern as shown in FIG. 9. Construction of this pattern may be divided into two parts: assembly of the structure; and impression and application of the designs of the calibration pattern (10).

The structure is manufactured using structural profiles made of aluminum, and smooth aluminum panels (100) to form the surfaces where the designs will be attached, wherein the distance between the panels (100) (center to center) must be equal to the DBC (distance between cameras (3)) with a small maximum tolerance of 5 cm.

The designs (10) should each be applied to one end of the calibration pattern so that the arrows point in the same direction and are located on the ends of the pattern.

The designs (10) are provided in ready-to-print digital format. It is also recommended that the designs (10) be manufactured in specialized graphics, using matte vinyl adhesive.

The adhesives should be applied after the panels are drilled (100) and before being placed on the structure. Application of the adhesives on the smooth panel (100) of the pattern should be done carefully so as not to create bubbles, have a wrinkled design, or damage the design, which could hamper calibration of the cameras (3).

After application of the adhesives to the support, the use of a matte spray varnish on top of the design is recommended. The varnish decreases interference from the ambient illumination in capturing images from the design.

Therefore, the SOIS tool provides real-time support for the DVC operation by calculating the radius of curvature and other magnitudes of interest to the launch engineer during installation.

Figure 10A:
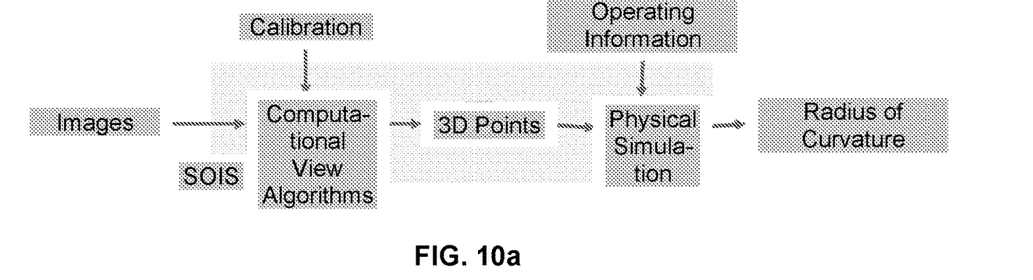
FIG. 10a shows a flow chart of the SOIS method of this invention.
Figure 10B:
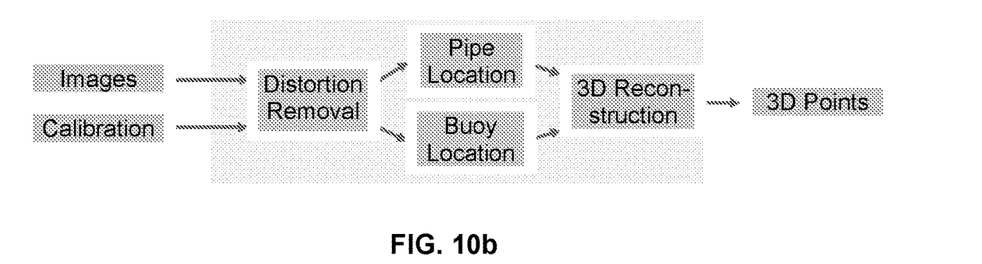
FIG. 10b shows the detail of the 3D reconstruction of a pipe in accordance with the SOIS method of this invention.

FIG. 10a shows a flowchart from the SOIS of this invention. FIG. 10b shows the detail of the 3D reconstruction of a pipe (1) in accordance with the SOIS method of this invention.

As can be seen, the SOIS basically comprises the steps of: image capture; calibration; computational view for 3D reconstruction; and physical simulation.

Images are captured through the two cameras (3) positioned on the ROV (2), as presented previously. The intrinsic and extrinsic calibrations of the cameras (3) are obtained on board prior to lowering the ROV (2). Characteristics of the flexible pipe (1) and the accessories used, such as straps (71) and buoys (7), are also provided. In the end, information is obtained on position, geometry, curvature, and vertical movement along the pipe (1), and other information that is of interest to the launch engineer who is responsible for the DVC operation is obtained as well.

The video capture module receives the images coming from the stereo arrangement of the calibrated cameras (3). For each frame of a camera (3) there is the equivalent in the other, and both are processed and sent to the next Computational View module.

Figure 11:
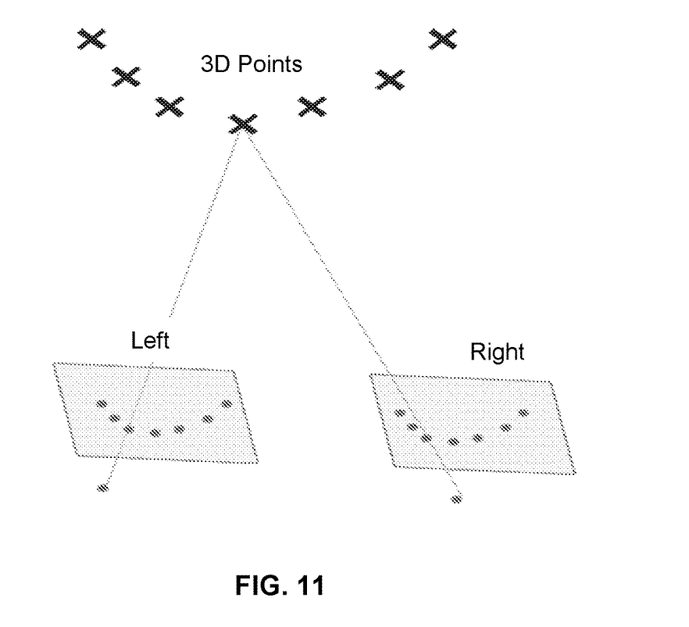
FIG. 11 schematically shows the action of the 3D reconstruction module from the points in each frame from the cameras, in accordance with one configuration of this invention.

The Computational View module is responsible for 3D reconstruction of the points sampled on the flexible pipe (1) (centroids from the line markings (1)). It receives the pairs of frames from the capture module and the calibration of the two cameras (3) as input so that it can extract metric information from the points of the frames (triangulation). FIG. 11 schematically shows the action of the 3D reconstruction module from the points in each frame of the cameras (3), in accordance with a configuration from this invention.

From these inputs, the pipe (1) may be reconstructed in 3D through four principal stages, image processing, detection of points on the flexible pipe (1) in each frame from each camera (3), matching (correspondence) between the points obtained in each frame from the cameras (3), and triangulation to obtain 3D positioning of the points identified on the pipe (1).

During the image-processing stage, the distortions caused by the camera (3) lenses are removed from the frames and are passed [through] filters to remove noise. Next, during the detection stage, the images are made binary in order to identify the candidate points to be identified. During the matching stage, correspondences are found between the points in one frame with points of the equivalent frame from the other camera (3) using the calibration information. The triangulation stage receives those matches and the information from the calibration on the distance and rotation between the cameras (3) for 3D reconstruction of the flexible pipe (1).

Once reconstruction is done, it is sent for physical simulation and the computational view module continually repeats this process, receiving the next frames as input.

The physical simulation module receives the reconstructed 3D points as input, and simulates the static equilibrium of these points using the description of the operating scenario to obtain the estimate of the radius of curvature at each point detected on the flexible pipe (1) in real time.

Figure 12:
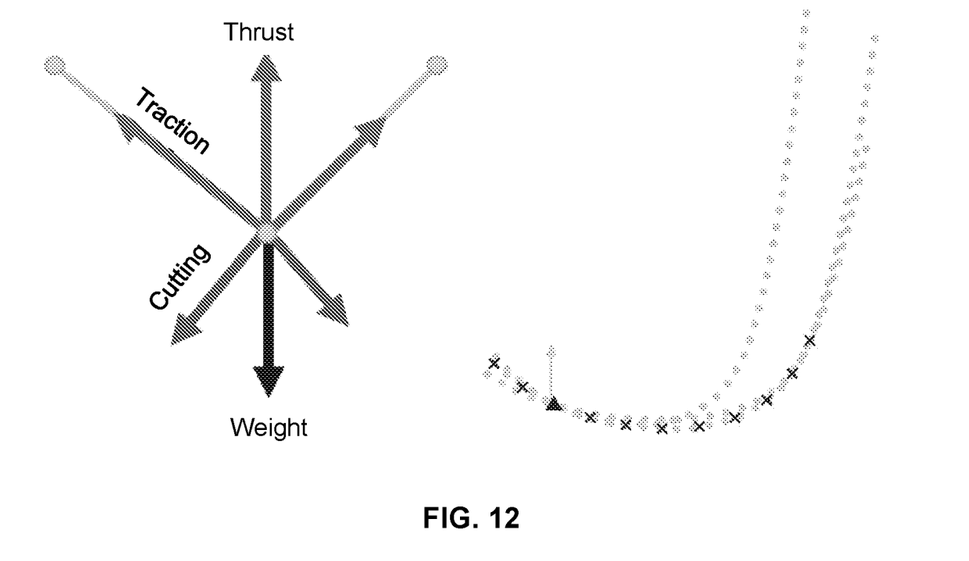
FIG. 12 schematically shows the iterative process of adjusting the system of particles $\{p_i\}$, to the reconstructed 3D points used in the physical simulation of the static equilibrium of the SOIS.

The physical simulation module makes the adjustment to a particles system $\{p_i\}$, which adjusts each particle to the reconstructed 3D points $\{x_j\}$ in the condition of the upright VCM, which is its status prior to being coupled to the undersea equipment.

At this point, the flexible pipe (1) is modeled by a set of particles where forces of traction, moment and gravity that act on them are balanced. The solution of the particles system is obtained by imposing as boundary conditions the 3D position of the reconstructed 3D points $\{x_j\}$. After the convergence of the particles system, various physical magnitudes inherent to the actual status of the reconstructed pipe can be calculated, such as the radius of curvature, forces, and moments.

FIG. 12 schematically shows the iterative process of adjustment of the particles system $\{p_i\}$ to the reconstructed 3D points used in the physical simulation of the static equilibrium of the SOIS.

The particles system from the physical simulation is represented by the set of its points $\{p_i\}$. The set $\{x_j\}$ represents the reconstructed 3D points. The static equilibrium equations, defined as E, to be maintained by each particle, are provided by the equation: $E(\{p_i\}, h)=0$.

These equations consist of the sum of the forces that act on each particle, such as traction, cutting, gravity, friction, normal, among others. Those forces are given both as a function of the position of the particles $\{p_i\}$ as well as a function of the physical properties of the equipment, such as axial rigidity, flexural rigidity, and mass. These properties are represented by the value h and are constant during execution of the SOIS method.

Figure 13:
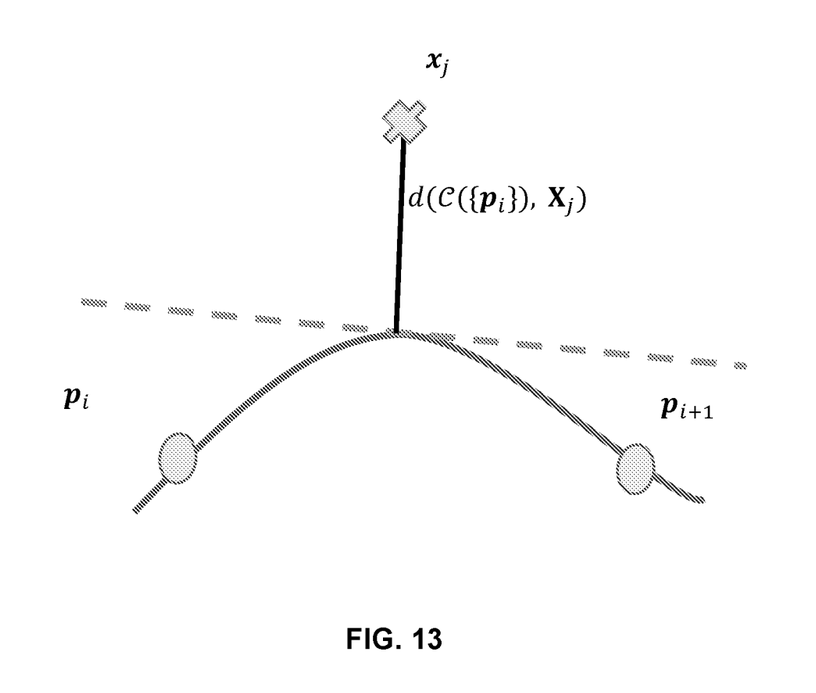
FIG. 13 shows the calculation of the distance between the reconstructed 3D point $\{x_j\}$ and the point from the interpolated curve $e(\{p_i\})$ through the particles system $\{p_i\}$ in accordance with the optimization method used in the physical simulation of the static equilibrium of the SOIS.

The set of particles from the system of finite elements form a discrete curve B and the adjustment of the curve may be defined as: $\min \Sigma_j d(e\{p_i\}), X_j)^2$.

FIG. 13 shows the adjustment of the interpolated curve by the system of particles $\{p_i\}$, in accordance with the SOIS method.

Figure 14:
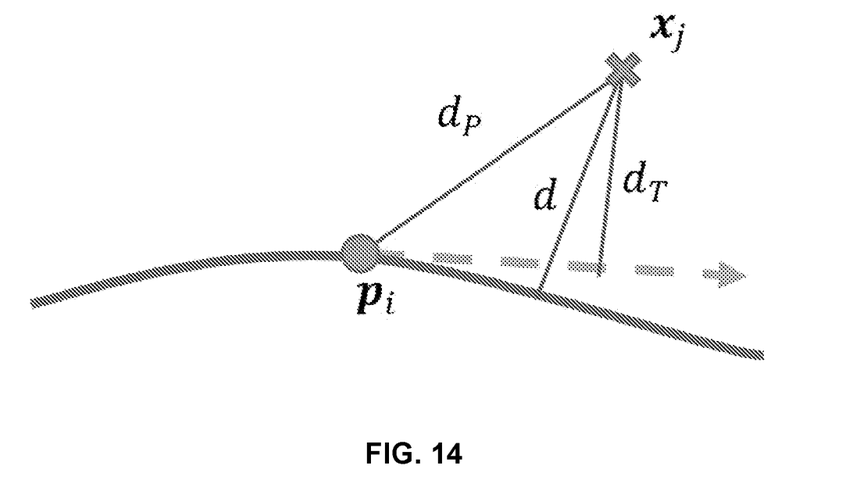
FIG. 14 shows the approximation used to calculate the distance of the interpolated curve $e(\{p_i\})$ through the particles system $\{p_i\}$ using the vector that is tangent to the interpolated curve, as projected by this invention.

As this is a discrete curve, the distance d between the point and curve is not trivial, therefore the following approximation was adopted that consists of the distance between the point and the tangent of the curve in a data point on the curve:

$$d_T(x_j, p_i) = (x_j - p_i) - T_i^*(x_j - p_i)$$

where $T_i$ is the unitary vector tangent to the curve on the point $p_i$ in accordance with FIG. 14.

FIG. 14 shows the approximation of the interpolated curve by the particles system $\{p_i\}$, as described above.

From what is laid out in this report, it is clear, therefore, that the invention solves the problem in the state of the art, which is proposed, to wit, to provide a support tool for the operation of undersea facilities that allows precise estimation of the forces on a VCM, and the radius of curvature of the pipe (1) during all steps of a DVC operation.

Countless variations in the scope of protection of this application are allowed. Therefore, the fact that this invention is not limited to the particular configurations/realizations described above is reinforced.

The invention claimed is:

1. A method for supporting an operation of subsea facilities for 3D reconstruction of flexible pipes during a first-end direct vertical connection (DVC) operation, the method comprising:
   painting of at least one flexible pipe of the flexible pipes; and
   performing a 3D reconstruction of 3D points sampled on the flexible pipe to obtain a radius of curvature along the flexible pipe,
   wherein the painting comprises:
      painting the flexible pipe with a first specific regular pattern,
      painting a bend restrictor with a second specific regular pattern that is compatible with the painting of the first specific regular pattern of the flexible pipe,
      painting straps for buoys with a third specific regular pattern, and
      painting hoisting straps of an arch bend, for a second-end DVC operation with a fourth specific regular pattern; and
   wherein the 3D reconstruction comprises:
      capturing images of the flexible pipe during the first-end DVC operation;
      sending the captured images to a dedicated computer; and
      processing the captured images, and generating the radius of curvature along the flexible pipe.

2. The method of claim 1, wherein the first specific regular pattern comprises a staggered and regular sequence of black and white areas, and where the specific regular pattern is done using matte paint, and the length of a white area is equal to the external diameter (d) of the flexible pipe, and the length of a black area is equal to half of the external diameter (d/2) of the flexible pipe.

3. The method of claim 2, wherein the first specific regular pattern on the bend restrictor comprises:
   internal rings are painted white;
   external rings are painted black; and
   an adaptation piece is painted white.

4. The method of claim 2, wherein the straps for the buoys are marked with matte tape in black and white, wherein the marking of a first strap of a first buoy of the buoys comprises a section of the first strap closest to the flexible pipe marked with black tape and a remaining section of the first strap is marked with white tape, and second straps on other buoys are marked with black tape;
   wherein a first part of the first strap rolled up on an area of the flexible pipe or the bend restrictor is marked to prevent impaired recognition of the white paint on the flexible pipe; and the hoisting straps are marked with black matte tape,
   wherein a second part of the hoisting strap straps is rolled up on a region of the flexible pipe to prevent impaired recognition of the white paint on the flexible pipe.

5. The method of claim 1, further comprising:
   sending at least one of a group of parameters to the dedicated computer including:
      a type of DVC;
      a water level;
      a pipe laying support vehicle-vertical connection module (PLSV-VCM) distance;
      a pipe laying support vehicle-hoist {PLSV-Hoist) distance;
      a length of a first hoisting strap;
      a length of a second hoisting strap;
      a position of the first hoisting strap;
      a position of the second hoisting strap; and
      a side of a coupling in the image.

6. The method of claim 1, further comprising:
   sending at least one of a group of parameters from the flexible pipe to the dedicated computer including:
      a minimum radius of curvature that the flexible pipe may attain during operation;
      a flexural rigidity;
      an axial rigidity on the flexible pipe; and
      a linear net weight of the flexible pipe when submerged in seawater.

7. The method of claim 1, further comprising:
   sending at least one of a group of parameters on the bend restrictor to the dedicated computer including:
      whether the flexible pipe is installed with the bend restrictor;
      a locking radius of the bend restrictor;
      a maximum length of the bend restrictor installed on the flexible pipe; and
      a net weight of the bend restrictor when submerged in seawater.

8. The method of claim 1, further comprising:
   sending at least one of a group of parameters from an adaptor to the dedicated computer:
      whether the adapter is used to connect the flexible pipe to a vertical connection module (VCM);
      a length of the adaptor; and
      a net weight of the adaptor when submerged in seawater.

9. The method of claim 1, further comprising;
   sending at least one of a group of parameters from a connector to the dedicated computer:
      a length of the connector; and
      a net weight of the connector when submerged in seawater.

10. The method of claim 1, further comprising:
    sending at least one of a group of parameters from a vertical connection module (VCM) to the dedicated computer:
       a smallest angle that a gooseneck forms with a vertical axis of the VCM;
       a vertical distance from a flange of the VCM to a sea floor;
       a vertical distance from an eyebolt to the flange;
       a horizontal distance from the eyebolt to the flange;
       a vertical distance from the flange to a center of gravity;
       a horizontal distance from the flange to the center of gravity;
       a vertical distance from the flange to a base of the VCM;

a horizontal distance from the flange to a center of a hub on the VCM; and a weight of the VCM when submerged in seawater.

11. The method of claim 1, further comprising:

sending at least one of a group of parameters from the buoys to the dedicated computer:

a distance between a flange of a vertical connection module (VCM) and a point at which a buoy of the buoys is attached; and a net thrust of the buoy.

12. The method of claim 1, further comprising:

calibrating cameras to obtain intrinsic and extrinsic parameters from video cameras in DVC operations, wherein the calibration includes capturing images from a calibration pattern of a previously known image.

13. A system for supporting operation of subsea facilities for 3D reconstruction of flexible pipes during a first-end direct vertical connection (DVC) operation comprising at least one flexible pipe of the flexible pipes painted with a first specific regular pattern, and means for performing a physical simulation to obtain a radius of curvature of the flexible pipe, wherein the system comprises:

a means for capturing images from the flexible pipe during a direct vertical connection (DVC) operation;

a means for sending the captured images to a dedicated computer; and a means for processing the captured images generating information from the radius of curvature along the flexible pipe, wherein the operation includes at least one of:

a bend restrictor painted with a second specific regular pattern;

straps for buoys painted with a third specific regular pattern; and hoisting straps of an arch bend painted with a fourth specific regular pattern, for a second-end DVC operation.

14. The system of claim 13, wherein the means for capturing images from the flexible pipe during the DVC operation, comprise:

at least two video cameras to capture the images of the flexible pipe, wherein the cameras are high resolution in low-light environments, and are resistant to a subsea environment, wherein the cameras comprise a light sensitivity of at least 1.3×10-3 Lux; and a field of vision in water is a minimum of 802 degrees;

wherein a distance between the cameras is a minimum of 1 meter and a maximum of 1.5 meters;

wherein the cameras are positioned next to each other and at substantially a same height in relation to base of a remotely operated vehicle (ROV), and lenses of the cameras are aligned; and wherein axis of symmetry of the cameras are substantially parallel.

15. The system of claim 14, further comprising:

a calibration pattern for calibrating the video cameras, the calibration pattern comprising two opposite panels, wherein a distance between the panels is substantially equal to a distance between the cameras, wherein pre-determined images are applied on each panel.

16. The method of claim 3, wherein the external rings are wrapped with black tape in order to hide anodes.

* * * * *